United States Patent [19]

Carbonell et al.

[11] Patent Number: 5,185,547
[45] Date of Patent: Feb. 9, 1993

[54] DYNAMO-ELECTRIC MACHINE STATOR CORE CONSTRUCTION

[75] Inventors: Luis E. Carbonell, Deltona; Lon W. Montgomery, Winter Springs, both of Fla.

[73] Assignee: Westinghouse Electric Corp., Pittsburgh, Pa.

[21] Appl. No.: 828,844

[22] Filed: Jan. 31, 1992

[51] Int. Cl.$^5$ .............................................. H02K 1/12
[52] U.S. Cl. ..................... 310/259; 310/42; 310/64; 310/91; 310/217; 310/260
[58] Field of Search ............... 310/217, 254, 260, 42, 310/64, 65, 91, 89, 258, 259

[56] References Cited

U.S. PATENT DOCUMENTS

| | | | |
|---|---|---|---|
| 4,126,799 | 11/1978 | Iogansen | 310/260 |
| 4,227,109 | 10/1980 | Mulach | 310/217 |
| 4,314,174 | 2/1982 | Srdoch | 310/260 |
| 4,315,173 | 2/1982 | Calfo | 310/260 |
| 4,494,030 | 1/1985 | Mulach | 310/217 |
| 4,894,573 | 1/1990 | Simpson | 310/217 |
| 5,051,642 | 9/1991 | Hediger | 310/260 |

*Primary Examiner*—R. Skudy
*Attorney, Agent, or Firm*—Michael G. Panzan

[57] ABSTRACT

Apparatus for aligning the endplates with the core of an electrical generator. To accommodate for relative thermal expansion and contraction between the endplates, having differing coefficients of thermal expansion due to being made of a different material than the core and fingerplates, an endplate variable alignment pin is provided for associating the endplates with the remainder of the core structure. The endplate is able to radial expand or contract in relation to the fingerplate plates in a controlled manner. An eccentric pin is provided to compensate for misalignment between the endplate and the fingerplates at each end of the stator core structure. Radial guide blocks are secured to the fingerplates prior to stacking and bolting of the core, to eliminate the need for in situ welding in constricted areas after core construction.

4 Claims, 4 Drawing Sheets

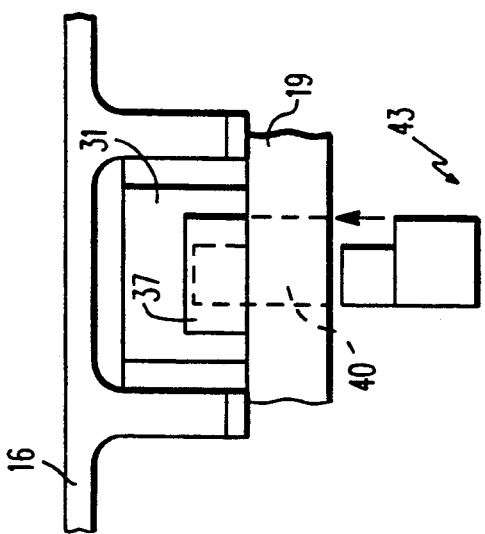
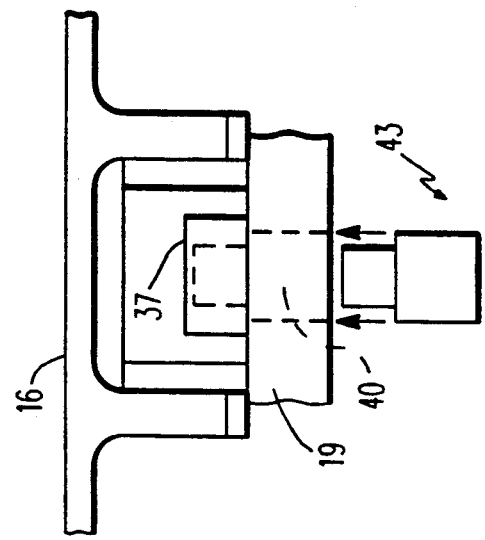
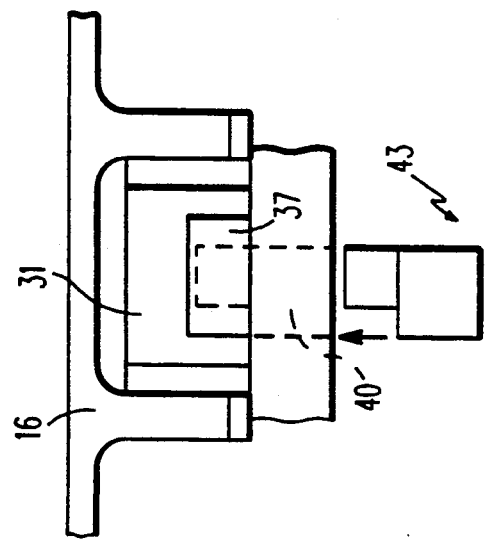
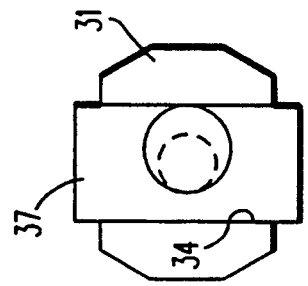
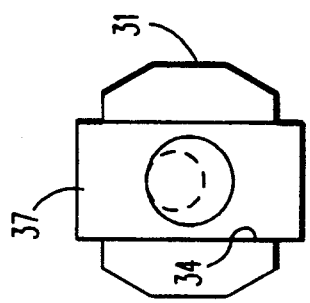
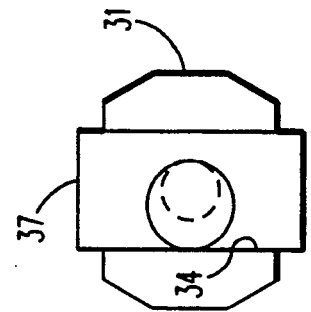

DYNAMO-ELECTRIC MACHINE STATOR CORE CONSTRUCTION

TECHNICAL FIELD

The invention relates to stator assemblies for dynamo-electric machines, and more particularly to a variable alignment pin device for stator core end plates.

BACKGROUND OF THE INVENTION

Present designs for many generator stator cores consist of a multitude of individual laminations secured together to form the core. In large generators, this involves the use of several thousand laminations to form the core. To satisfy electromagnetic requirements, these laminations are typically made of iron or thin silicon steel. It is essential that these laminations be tightly clamped against each other so as to resist the fluctuating magnetic forces imposed on them during generator operation.

The required clamping force is generally provided by elongated through-bolts or studs which run the length of the core. These studs are uniformly distributed around the circumference of the core, or about the center of pressure of the stator core area. As an aid to evenly distribute the clamping force of the through-bolts over the area of the laminations, devices referred to as fingerplates are utilized. The fingerplates are segmented structures completing a full circle on the end of the core, there being typically eight (8) segments at each end of the core. The fingerplates are usually riveted to the first layer of laminations at each end of the stator core. Riveting serves to locate the fingerplates accurately relative to the laminations.

Adjacent the fingerplates, on the side opposite the laminations of the core, high conductivity endplates are also held in place by the through-bolts passing therethrough. These endplates are typically made of aluminum or copper, and are of one-piece construction. During operation of the generator, heavy electrical currents circulate within the high conductivity endplates. These currents divert end region magnetic fringing flux away from the flat surfaces of the ends of the stator core. Theses currents heat the endplates, causing them to be hotter than the core to which they are secured. The combination of the temperature differentials and differences in thermal expansivity between endplate and core, due to their being constructed of different materials, result in relative thermal expansion and contraction between the endplates and stator core during generator load changes. During these thermal expansion and contraction cycles, the endplates must be guided radially relative to the fingerplates to preserve original concentricity of the endplates, fingerplates and the core.

One such design used to accommodate this relative thermal expansion and contraction includes radial guide pins which are inserted through round holes in the endplates into radial guide slots which are fixed to the fingerplates. These radial guide slots are presently machined into blocks which are welded to the fingerplates after the core laminations have been stacked, the endplates placed, and the through-bolts inserted and tightened. This arrangement is necessary because the fingerplates and endplates cannot be aligned closely enough to permit direct insertion of the guide pins through the holes in the endplates and into radial guide slots. This in situ welding gives rise to manufacturing difficulties, due to the rather tight location within which the guide blocks are welded. Additionally, sizing and positioning of the guide blocks are difficult when working in such a limited area. Close alignment is required, to insure that the movement between the endplates and the core due to the relative thermal expansion is provided for.

It is therefore an object of the present invention to provide an alignment device for between a generator stator core and associated endplates which obviates the need for welding operations after the core has been assembled.

DISCLOSURE OF THE INVENTION

The above objects are attained by the present invention, according to which, briefly stated, a stator for a dynamo-electric machine includes a stator core constructed of a plurality of laminations. Means are provided for securing the laminations together, the securing means including plate means for uniformly distributing the clamping force provided by the securing means about the circumference of the core. An endplate having a different thermal expansivity than the core is attached to the securing means. Means are also provided for aligning the endplate with the securing means and core to compensate for relative thermal expansion and contraction between the endplate and the securing means, wherein the aligning means is secured to the securing means prior to core construction.

BRIEF DESCRIPTION OF THE DRAWINGS

Various other objects, features, and advantages of the invention will become more apparent by reading the following detailed description in conjunction with the drawings, which are shown by way of example only, wherein:

FIGS. 4A, 4B, 4C and 5A, 5B and 5C, show radial and axial views, respectively, of the alignment of the stator core endplate using the present invention.

DESCRIPTION OF THE EMBODIMENT

Figure 1:
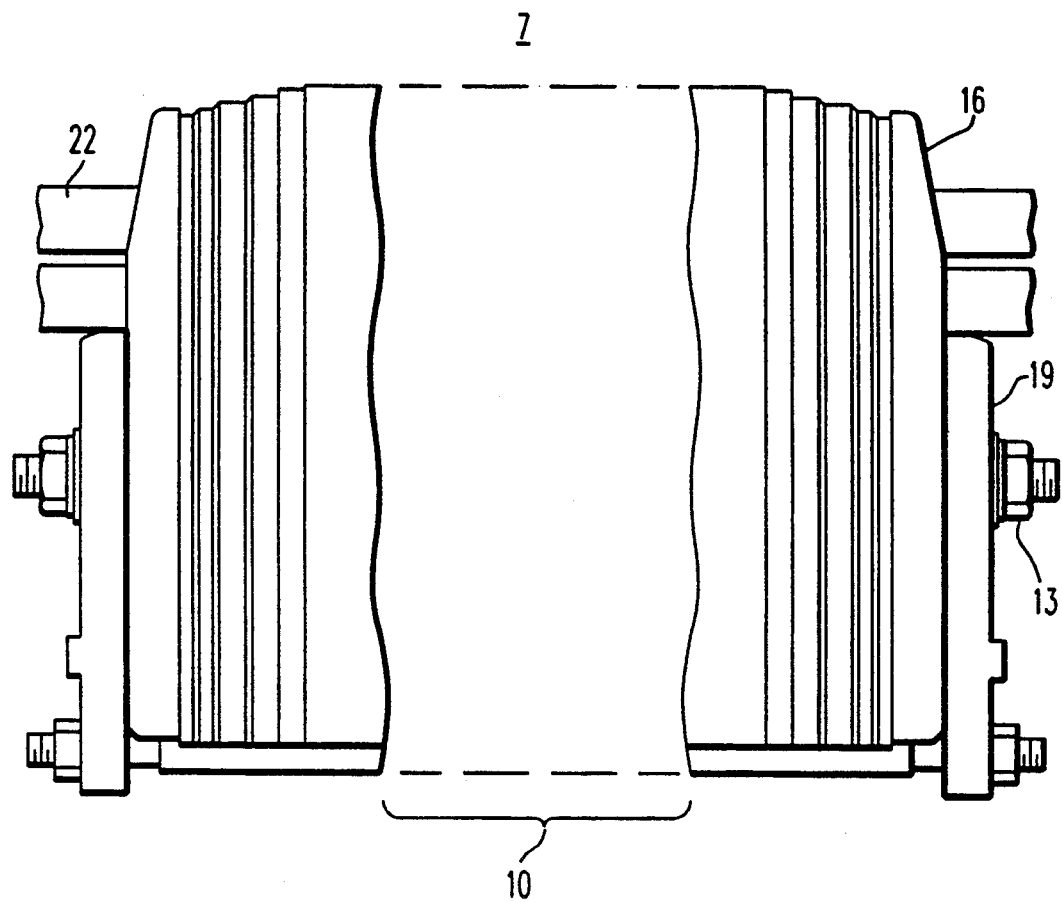
FIG. 1 shows a longitudinal section of an exemplary generator stator core.
Figure 2A:
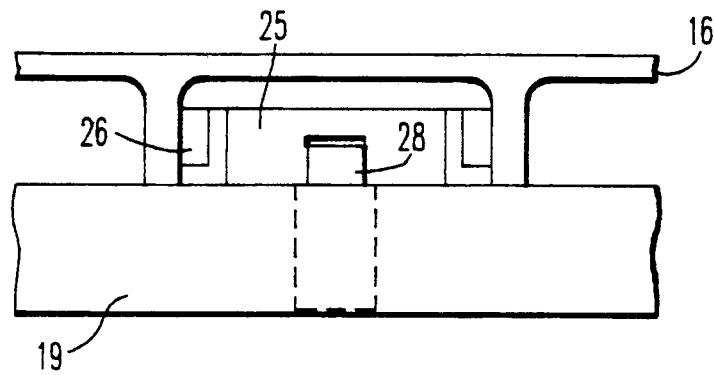
FIG. 2, consisting of FIGS. 2A and 2B, shows a prior art arrangement for aligning the core with associated endplates.
Figure 2B:
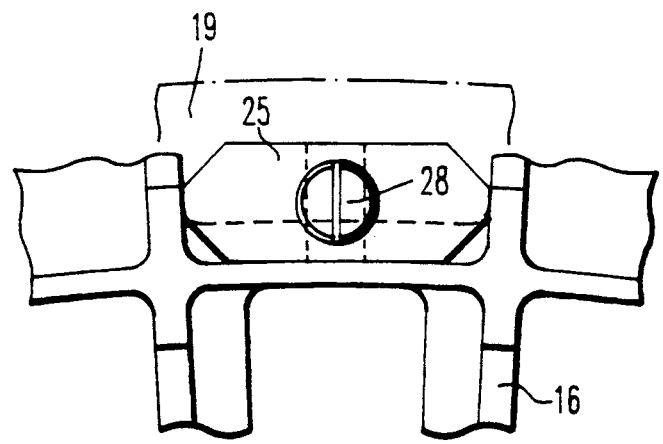

Referring now to the drawings in detail, wherein like numerals indicate similar elements among the various figures, FIGS. 1 2A and 2B show a typical arrangement for a generator 7 stator core 10. The iron core, typically made of silicon steel, is formed from a plurality of individually stacked thin plates. The plates are clamped together by through-bolts 13 which pass completely through the core 10. At each end of the core are fingerplates 16 and endplates 19. The endplates are generally made of an aluminum or copper alloy, which provides for enhanced operational characteristics. The fingerplates 16 are typically made from stainless steel. Associated with the core 10 are the windings 22 for the generator 7.

Due to the differences in material characteristics between the endplates 19 and the remainder of the core 10, they have a higher coefficient of thermal expansion in relation to the core. Moreover, due to the functioning of the endplates 19 in the circulation of heavy electrical currents therein, the endplates are generally at a hotter temperature than the stacked laminations and the fingerplates 16. Therefore, relative thermal expansion take place between the endplates 19 and the core 10 during the normal operation of the generator 7. As the generator is operated, cyclic heating and cooling occur as a result of continual load changes.

To accommodate the relative expansion and contraction between endplates 19 and fingerplates 16, guide blocks 25 are welded, as indicated at 26, to the fingerplates after the core 10 has been constructed in convention generator designs. Guide pins 28 associated with the endplates 19 cooperate with the guide blocks 25 to allow for the relative radial expansion and contraction between the two structures.

Figure 3:
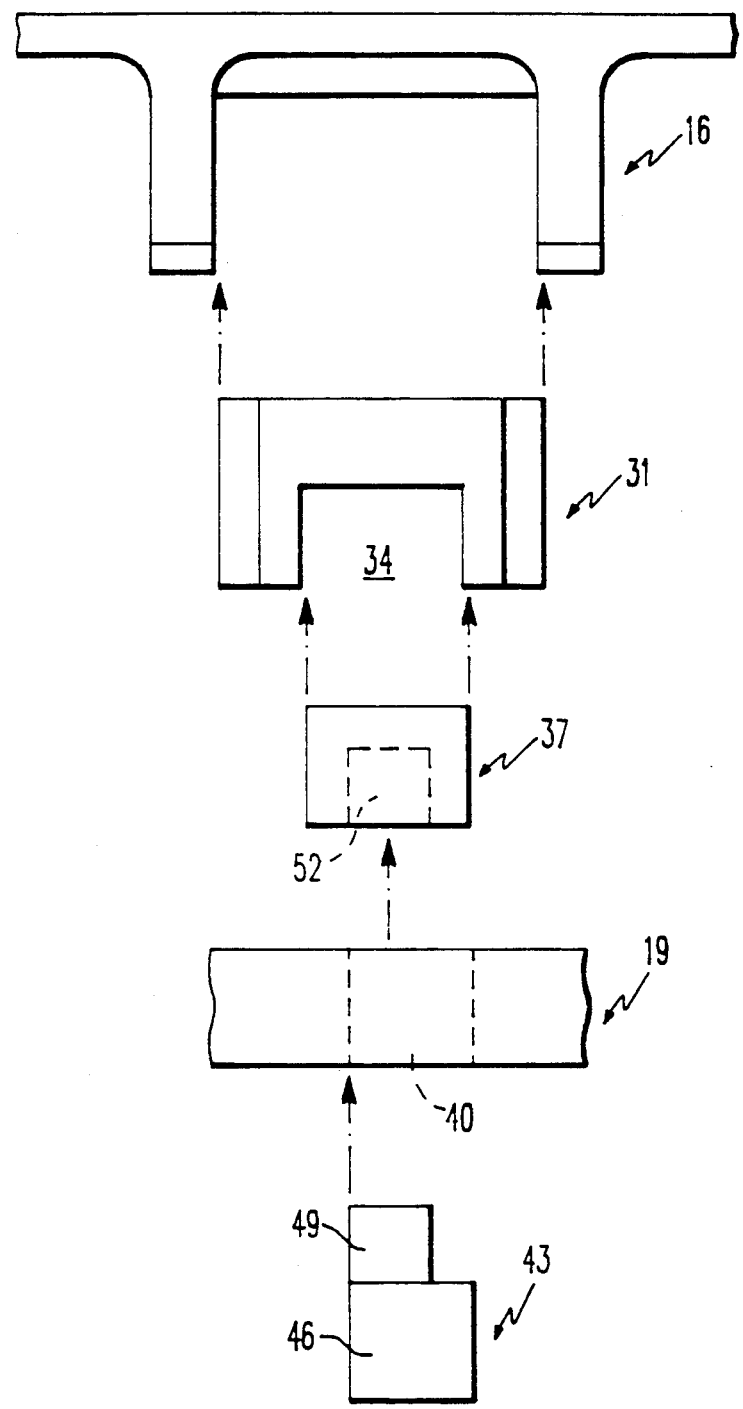
FIG. 3 shows an exploded assembly of the components of the present invention.

To more easily provide for this relative movement between the endplates 19 and the fingerplates 16, and to afford for easier construction of the generator core 10, the present invention shown in FIG. 3 is utilized. As shown in this exploded view, associated with the fingerplate 16 are a radial guide block 31 and a slider plate 37. The radial guide blocks 31 can either be pre-cast into or pre-welded onto the fingerplates 16 prior to core construction. This obviates the need for in situ welding common to conventional generator construction. The radial guide blocks 31 have a radial guide slot 34 which is also pre-machined. The purpose of the slider plate 37 is to accommodate for the radial movement of the endplate 19 relative to the fingerplate 16, as will be more fully described hereinafter.

The endplate 19 has a hole 40 therethrough, in the area of the radial guide block 31 and slider plate 37, to receive an eccentric pin 43. The eccentric pin 43 connects the slider plate 37 and the endplate 19. The eccentric pin 43 has two (2) generally cylindrical sections. The first 46, larger section snugly fits in the hole 40 of the endplate 19, preferably with a press fit. The second section 49, smaller than the first, mates with a hole 52 in the slider plate 37. The second section 49 is offset from the centerline of the first 46, hence the component's designation as an eccentric pin 43. The eccentricity between the first and second sections 46,49 allows for any minute misalignment of fingerplate 16, radial guide slot 34 and endplate holes 40.

As represented in FIG. 3, the centerline of the slot 34 in the guide block 31 is shown as being offset to the left of the center of the hole 40 in the endplate 19. The eccentric pin 43 is rotated and the slider plate 37 is moved radially in the radial guide slot 34 until the pin can be inserted both through the endplate 19 and into the hole 52 in the slider plate 37. Thus alignment of radial guide slots 34 in the guide blocks 31 with the holes 40 through the endplates 19 is accomplished by rotating the eccentric pin 43 and radially sliding the slider plate 37 to permit alignment of the radial guide slot 34 and endplate hole 40. FIGS. 4A, 4B, 4C, 5A, 5B and 5C show radial and axial views of this alignment operation. FIGS. 4A and 5A show the radial guide slot 34 positioned left of the endplate hole 40; FIGS. 4B and 5B show the radial guide 34 and hole as being centered; and FIGS. 4C and 5C are representative of the radial guide slot 34 being right of the endplate hole 40.

During operation of the generator 7, during which the endplate 19 radially expands and contracts with respect to the fingerplates 16, the slider plates 37 will simply slide within the radial guide slot 34 of the guide block 31 affixed to the fingerplate. The slider plate 37 remains aligned with the endplate 19 by means of the eccentric pin 43. In order to eliminate the possibility of cocking or binding of the slider plate 37 during thermally induced excursions of the endplates 19, the slider plates are preferably made larger in the radial direction than the radial guide slot 34 provided in the radial guide block 31.

Preferably the eccentric pins 43 are press fit into the slider plates 37 and snug fit into the endplate holes 40. The pins may be secured to the endplate 19 by prick punching after construction. An alternative is to capture the pins 43 by stator end turn brace gapped brackets (not shown), which is used in current generator construction. It is desired that the eccentric pins be locked to prevent their rotation during the radial movement of the endplates 19. This locking can be accomplished either by locking the pin 43 to the hole 40 through the endplate 19, to the hole 52 in the slider plate 37 or both. One method of accomplishing this is by providing splines on the outside of the pin 43 and matching splines on the inside of the hole 40. Another option would be to include a locking groove in the axially outboard face of the pin 43, with matched grooves on the surface of the endplate 19. These are merely examples of methods to lock the eccentric pin 43 with respect to the endplate and/or slider is not intended to limit the present invention to a particular design.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A stator for a dynamo-electric machine comprising:
   a stator core including a plurality of laminations each having a plurality of holes therethrough, said laminations being stacked so as to form the stator core having opposed ends;
   means for securing said laminations together, said securing means including fingerplate for uniformly distributing a clamping force provided by said securing means;
   an endplate cooperatively associated with said securing means, the endplate having a different coefficient of thermal, expansion than said securing means; and alignment means for aligning the endplate with said fingerplate, said alignment means being adapted to facilitate relative radial thermal expansion between the endplate and said securing means, and wherein said alignment means comprises: a guide block attached to one of said fingerplates, the guide block having a radial slot; a slider plate adapted to slide in the radial slot, the slider plate having an opening therein; the end plate having a hole therein and located in an area adjacent the guide block; and pin means having one and adapted to engage the slider plate opening.

2. The stator as recited in claim 1, wherein said finger plates are disposed at opposite ends of the stator core, and said securing means comprising a plurality of bolts which extend from said fingerplates at one end of the stator core and through said holes in said laminations to said fingerplates at an opposite end of the stator core.

3. The stator as recited in claim 2, wherein said fingerplates comprise a plurality of fingerplate segments circumferentially disposed about each end of the stator core, each of said segments having at least one bolt passing therethrough to a fingerplate segment at the opposite end of the stator core.

4. The stator as recited in claim 1, wherein the one end of said pin means has a centerline which is offset from a centerline of the second end of said pin means.

* * * * *